(12) United States Patent
Lehman et al.

(10) Patent No.: US 6,687,025 B2
(45) Date of Patent: Feb. 3, 2004

(54) DIGITIZER WITH MASKING APPARATUS

(75) Inventors: Richard Lehman, Nashua, NH (US); Lee Batchelder, Derry, NH (US)

(73) Assignee: Howtek Devices Corporation, Nashua, NH (US)

( * ) Notice: Subject to any disclaimer, the term of this patent is extended or adjusted under 35 U.S.C. 154(b) by 0 days.

(21) Appl. No.: 10/305,081

(22) Filed: Nov. 26, 2002

(65) Prior Publication Data

US 2003/0098996 A1 May 29, 2003

Related U.S. Application Data

(60) Provisional application No. 60/333,333, filed on Nov. 26, 2001.

(51) Int. Cl.[7] .......................... H04N 1/04; H01L 27/00; F21S 4/00; F21V 1/12
(52) U.S. Cl. ................... 358/475; 250/208.1; 362/317; 362/359; 362/217; 362/310; 362/311
(58) Field of Search .................. 358/475; 250/208.1; 342/317, 359, 217, 310, 311

(56) References Cited

U.S. PATENT DOCUMENTS

| | | | |
|---|---|---|---|
| 5,101,099 A | * 3/1992 | Funada et al. | 250/208.1 |
| 5,223,954 A | 6/1993 | Miyakawa et al. | 358/474 |
| 5,414,489 A | 5/1995 | Kaplan | 355/67 |
| 5,414,534 A | 5/1995 | Bindon | 358/483 |
| 5,442,533 A | * 8/1995 | Kaplan | 362/303 |
| 5,545,913 A | 8/1996 | Quinn et al. | 257/443 |
| 5,555,123 A | * 9/1996 | Kaplan | 359/197 |
| 5,568,320 A | 10/1996 | Rees et al. | 359/652 |
| 5,583,663 A | 12/1996 | Boeve | 358/487 |
| 5,682,033 A | 10/1997 | Cattorini | 250/208.1 |
| 5,912,746 A | 6/1999 | Cilke et al. | 358/482 |
| 5,930,433 A | 7/1999 | Williamson et al. | 385/116 |
| 6,064,062 A | 5/2000 | Bohn | 250/237 R |

* cited by examiner

Primary Examiner—Edward Coles
Assistant Examiner—Houshang Safaipour
(74) Attorney, Agent, or Firm—Grossman, Tucker, Perreault & Pfleger, PLLC

(57) ABSTRACT

A digitizer having an illuminator with a mask configured to rotate about a central axis for reducing flare from the illuminator when digitizing a data medium having a width less than an associated length of the illuminator. A page width guide of the digitizer may be operatively coupled to the mask so that movement of the page width guide automatically rotates the mask a predetermined amount. A rare gas, external electrode, cold cathode fluorescent lamp may also be utilized as an illuminator in the digitizer.

24 Claims, 3 Drawing Sheets

DIGITIZER WITH MASKING APPARATUS

CROSS-REFERENCE TO RELATED APPLICATIONS

The present application claims the benefit of the filing date of U.S. Provisional Application No. 60/333,333 filed Nov. 26, 2001, the teachings of which are incorporated herein by reference.

FIELD OF THE INVENTION

The present invention relates generally to a digitizer and in particular to a digitizer having a mask for reducing the affects of stray light.

BACKGROUND OF THE INVENTION

Digitizers convert optical densities of an image on a data medium to a digitized signal representative of the image recorded on the data medium. Such digitizers generally include an illuminator and a light sensitive element. The illuminator provides light that is directed towards the data medium. The light sensitive element accumulates photons based on the various optical densities of various portions of the recorded image on the data medium. The light sensitive element converts such accumulated photons into an associated analog electric charge. Electric processing circuitry accepts such an analog signal and converts it to a corresponding digital signal. The digital signal may be stored, retrieved, transferred, and processed in any variety of ways similar to other electronic data.

The light sensitive element in such a digitizer typically has a fixed field of view. When reading data from a data medium that has a width less than an associated length of the illuminator, excess illumination occurs beyond the edges of the data medium yielding undesirable flare. This flare may adversely affect the performance of the light sensitive element and hence the quality of the overall digitizing process. Some masking mechanisms have been developed to mask the outer edge of the illuminator based on a width of the data medium to be digitized. However, such methods linearly transport the mask between the illuminator and the light sensitive element requiring a complex mask transport system. In addition, there is not a simple and efficient way to automatically position the mask based on the width of the data medium. Accordingly, there is a need in the art for a simpler and less expensive masking mechanism to reduce flare where the mask is rotated about a central axis.

BRIEF SUMMARY OF THE INVENTION

A digitizer for digitizing a data medium consistent with the invention includes: an illuminator configured to generate light directed towards the data medium to be digitized; and a mask configured to rotate about a central axis, wherein a portion of the mask affects a portion of the light from an associated portion of the illuminator depending on an amount of rotation of the mask from a base rotation position.

According to another aspect of the invention, there is provided a method of reducing flare from an illuminator during digitizing of a data medium that includes the steps of: generating light directed towards the data medium; and rotating a mask about a central axis a predetermined amount from a base rotation position, wherein the mask affects a portion of the light from an associated portion of the illuminator depending on the predetermined amount of rotation from the base rotation position.

According to a further aspect of the invention, there is provided a digitizer for digitizing a transparent data medium in a medical application including: an illuminator configured to generate light directed towards the transparent data medium to be digitized; a mask configured to rotate about a central axis, wherein a portion of the mask affects a portion of the light from an associated portion of the illuminator depending on an amount of rotation of the mask from a base rotation position; a lens configured to direct the light; a light sensitive element configured to convert the light directed from the lens into an analog signal representative of data recorded on the data medium, wherein the light sensitive element has a width substantially equal to a maximum width of the data medium; and electronic processing circuitry coupled to the light sensitive element, the circuitry configured to convert the analog signal into a digital signal representative of data recorded on the data medium.

According to a further aspect of the invention, there is provided a digitizer for digitizing a transparent data medium in a medical application including: an illuminator configured to generate light directed towards the transparent data medium to be digitized; a mask configured to rotate about a central axis, wherein a portion of the mask affects a portion of the light from an associated portion of the illuminator depending on an amount of rotation of the mask from a base rotation position; a light sensitive element configured to convert the light beam directed from the lens into an analog signal representative of data recorded on the data medium; and electronic processing circuitry coupled to the light sensitive element, the circuitry comprising an analog to digital converter configured to convert the analog signal to a digital signal, the digital signal having at least 16 bits of significant digits.

According to a further aspect of the invention, there is provided a digitizer for digitizing an image on a data medium including an illuminator configured to generate light directed towards the data medium to be digitized; a mask; and a page width guide mechanically coupled to the mask, wherein movement of the page width guide causes an associated movement of the mask.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
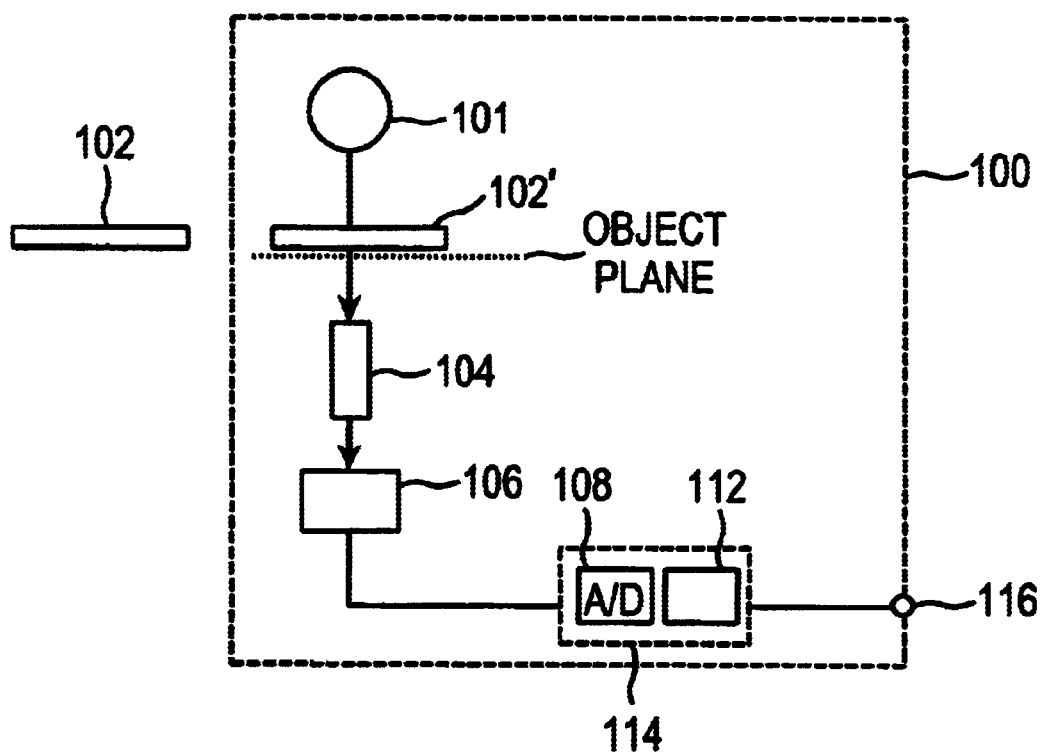
FIG. 1 is a simplified block diagram of a digitizer consistent with the invention.

FIG. 1 illustrates a simplified block diagram of a digitizer 100 consistent with the invention. The digitizer 100 generally includes an illuminator 101, a lens 104, a light sensitive element 106, and electrical processing circuitry 114 including an analog to digital converter 108 and a processor 112. In general, the digitizer 100 converts optical densities of an image on a data medium 102 to electrical signals that represent various intensities of light and thus densities of the data on the applicable medium.

The data medium 102 is first located in a position 102' to be digitized. The digitizer 100 may include a transport control system (not shown) to accept the data medium 102 and drive it to the position 102' to be scanned. Alternatively, the digitizer 100 may be a flat bed type scanner where a user would position the data medium 102 in position 102' and the illuminator 101 and light sensitive element 106 would move relative to the data medium 102 while in position 102'.

The data medium 102 may be any type of medium, e.g., transparent media or reflective media. For example, a transparent media may include an X-ray film used in medical applications. The digitizer 100 is illustrated as a digitizer for digitizing transparent media since the illuminator 101 is positioned above the object plane. However, a digitizer for digitizing reflective media may also be utilized where the illuminator would be positioned below the object plane.

Once the data medium 102 is properly positioned, light from the illuminator 101 passes through the data medium 102. The amount of light passing through the data medium depends on the transmittance or optical density of the particular image on the data medium 102 at each pixel. A lens 104 may also be used to direct the light towards the light sensitive element 106.

The light sensitive element 106 accumulates photons and converts such photons into an analog electrical signal representative of the accumulated photons. The light sensitive element 106 may by a variety of elements known in the art such as a charge coupled device (CCD) array or a CMOS array. The light sensitive element 106 may be in the form of a line, square, rectangle, or any various shape such that the whole data medium 102 may be virtually divided into areas and every area corresponds to an analog signal that represents the amount of light transmitted through that area. In this manner, an analog image signal may be obtained which represents the whole image recorded on the data medium 102.

The analog image is then processed by electronic processing circuitry 114. The electronic processing circuitry 114 may include a variety of devices known in the art including the analog to digital converter 108 for converting the analog signal into a digital signal and a processor 112. As such, a digital image signal may be output to terminal 116 for further electronic use, e.g., electronic storage, processing, and communication.

Figure 2A:
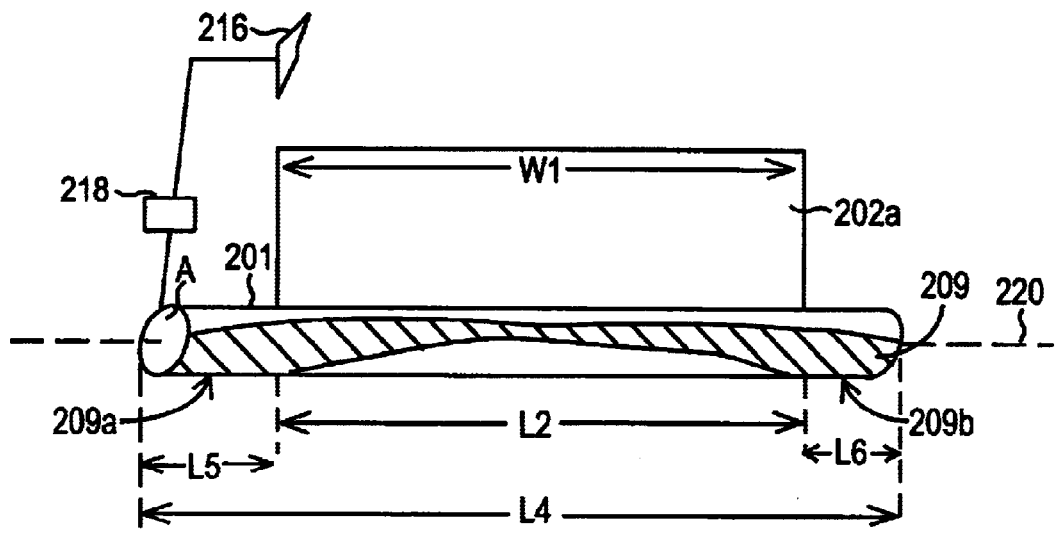
FIGS. 2A and 2B are perspective views of one embodiment of a mask consistent with the invention where the mask is affixed to an illuminator.
Figure 2B:
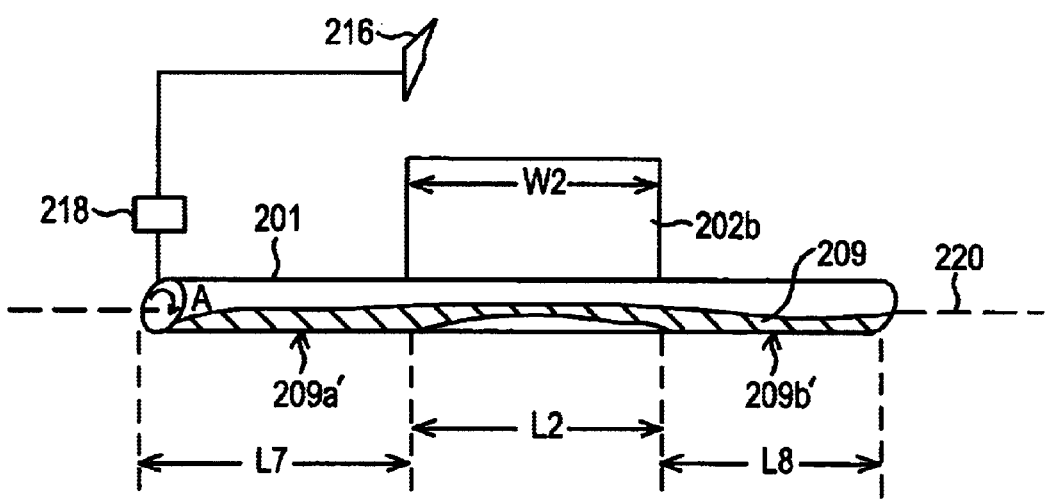

Turning to FIGS. 2A, 2B, a first embodiment of a mask consistent with the invention is illustrated. In general, the mask 209 reduces flare that may otherwise occur at the edges of a data medium when the data medium to be digitized has a width less than the length of the illuminator. In such instances, the extraneous illumination may adversely affect the performance of the light sensitive element 106 and hence the overall quality of the digitization process. The amount of light affected by various portions of the mask depends on the rotation position of the mask about a central axis 220 relative to a base rotation position.

FIG. 2A illustrates a data medium 202a to be digitized that has a width W1 that is less than the length L4 of the illuminator 201. In this embodiment, the mask 209 is affixed to the illuminator 201 and the illuminator 201 is configured to rotate. The mask 209 may be any variety of material known in the art for affecting the intensity of the light beam from the illuminator. The mask 209 affects the intensity of the light beam from the illuminator 201 based on the transmittance characteristics of the particular masking material utilized. In one embodiment, the mask has 209 has a low transmittance characteristic so that the mask substantially blocks a portion of the light directed towards the data medium. In this embodiment, the mask 209 may be opaque material such as dark tape, paint, or plastic material such as heat shrinkable tubing.

The mask 209 is positioned on the illuminator 201 in a pattern that depends, in part, on the length L4 of the illuminator 201 and the radius of a cross section of the illuminator. As the data medium 202a is to be digitized, the mask 209 rotates a predetermined amount from a base rotation position such that point A of the illuminator is directed upward as illustrated in FIG. 2A. As such, a portion 209a, 209b of the mask 209 reduces the intensity of the light directed towards the data medium 202a. The remainder of the light from the illuminator not affected by these portions 209a, 209b of the mask, or the effective width L1 of the light from the illuminator, may be advantageously made to be substantially equal to the width W1 of the data medium 202a to be digitized.

For instance, the illuminator 201 in FIG. 2A is rotated to a predetermined position such that a portion 209a, 209b of the mask 209 reduces the intensity of the light beam from the illuminator 201 along the exterior edges lengths L5 and L6 of the illuminator. As such, the effective width L1 of light from the illuminator is substantially equal to the width W1 of the data medium 202a to be digitized. The mask 209 may be positioned on the illuminator such that with every 10 degrees rotation of the mask from a base rotation position, the effective width of the light from the illuminator directed towards the date medium is adjusted in increments equal to 1/36 of the length of the illuminator.

Turning to FIG. 2B, the data medium 202b has a width W2 narrower than the width W1 of the data medium 202a of FIG. 2A. As such, the mask 209 is further rotated by rotating the illuminator 201. This exposes a greater portion 209a', 209b' of the mask 209 to the light directed towards the film 202b along the exterior edge lengths L7 and L8 of the illuminator. As such, the effective width L2 of the light from the illuminator is substantially equal to the width W2 of the film 202b.

Rotating the mask 209 about its central axis 220 may be accomplished by using a variety of means. In one embodiment, a page width guide 216 may advantageously be mechanically coupled by a variety of means such as gear train 218 to the illuminator 201. As a user moves the page width guide 216 to match the width of the film, the mask 209 is automatically rotated an associated amount so that the mask affects the proper amount of light at the exterior edges of the light source.

Alternatively, a separate sensor known to those skilled in the art may be used to determine the width of any data medium and through appropriate control means instruct the illuminator 201 to rotate about its central axis 220 to an associated proper position. For instance, the light sensor 106 may itself be utilized to establish the width of the data medium and thereby control the rotation of the mask.

Figure 3:
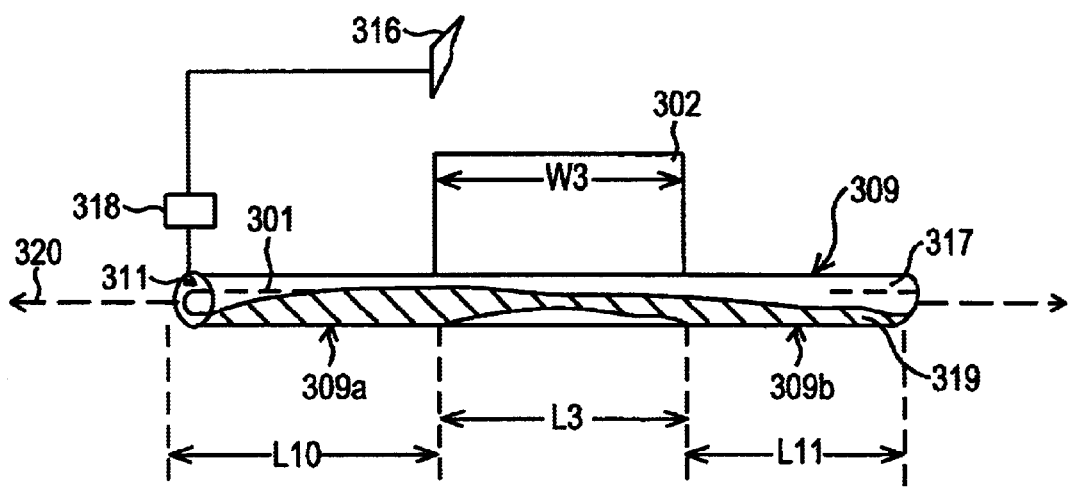
FIG. 3 is a perspective view of another embodiment of a mask consistent with the invention where an illuminator is disposed in a cavity formed by the mask.

Turning to FIG. 3, another embodiment of mask is illustrated where the mask 309 is configured to rotate about a central axis 320 and the illuminator 301 is stationary relative to the rotating mask 309. The mask 309 may have a cylindrical shape that forms an interior cavity 311. The illuminator 301 is disposed within this cavity 311, and may have its central axis coincident with the central axis 320 of the mask 309. The mask 309 may be constructed of a hollow clear tube having a clear portion 317 to which a masking material 319 is affixed. The masking material 319 may be a substantially opaque material such as dark tape, paint, or plastic material, such that the masking material 319 substantially blocks a portion of the light directed towards the data medium. As such, the transmittance characteristic of the masking material 319 is less than the transmittance characteristic of the clear portion 317 of the mask 309.

Similar to the earlier described embodiment, the mask 309 is configured to rotate about its central axis 320 so that a portion of the mask affects the light from the illuminator 301 directed towards the data medium 302. For instance, the mask 309 may be rotated to a predetermined position such that a portion 309a, 309b of the masking material 319 of the mask 309 reduces the intensity of the light from the illuminator 301 along the exterior edges lengths L10 and L11 of the illuminator. As such, the effective width L3 of the light beam from the illuminator is substantially equal to the width W3 of the data medium 302 to be digitized.

As with the other embodiment, a page width guide 316 may advantageously be mechanically coupled by a variety of means such as gear train 318 to the mask 309 such that as the page width guide 316 moves to match the width of the film, the mask 309 is automatically rotated an associated amount so that the mask affects the proper amount of light at the exterior edges of the light source.

In another embodiment of the invention, the illuminator 101 may be a rare gas, external electrode, cold cathode fluorescent lamp. Examples of such a rare gas include, but are not limited to, neon, xenon, and krypton. Typically, the illuminator of prior digitizers has utilized LEDs, conventional fluorescent lamps, cold cathode fluorescent lamps, Tungsten, or Xenon lamps. In contrast, a rare gas, external electrode, cold cathode fluorescent lamp combines most of the desirable characteristics of these prior lamps.

That is, the rare gas, external electrode, cold cathode fluorescent lamp has a fast warm up time less than about 0.2 seconds, and typically about 0.1 seconds, therefore serving well as an instant on illuminator similar to Tungsten and LEDs. It exhibits excellent stability. It has a high brightness, and it requires a medium power input of about 25 watts. The rare gas, external electrode, cold cathode fluorescent lamp also exhibits consistent light output characteristics over wide range of ambient temperatures. The lamp is also a diffuse light source similar to conventional fluorescent lamps. The lamp may serve as a transparency illuminator in a digitizer for illuminating a transparent data medium. The lamp may also serve as a reflective illuminator in a digitizer for illuminating a reflective data medium.

In another embodiment of the present invention, the light sensitive element 106 may have a linear array of small photo sensors which extends the full width of any data medium to be digitized, i.e., full width array. Accordingly, the array pixel size is the same as the object pixel size. The larger the array pixel size the more electrons can be held in each pixel site. As a result of a full width array, the digitizer 100 has both high sensitivity and dynamic range. The high sensitivity allows exposure time of the data medium 102 to be reduced, hence enabling a faster digitizing process.

In addition, imaging at the full width array ratio (1:1) may be accomplished with a self-focusing lens array (Selfoc lens array or SLA) as the lens 104. Selfoc is a trademark of Nippon Sheet Glass Company Limited Corporation of Japan. The SLA is both compact and efficient. It is typically designed specifically for 1:1 imaging, and may also be readily obtained with an even higher throughput than what is practically feasible with a conventional lens. The SLA may be composed of multiple inline optical quality glass rods approximately 1 mm in diameter. Each rod itself is a lens, which may produce a 1× image. The images from the rods may overlap to produce a relatively smooth illuminated contiguous narrow line image, e.g., a 14" by approximately 0.2" narrow line image. By comparison, conventional lenses produce a larger two dimensional image. Such a larger two dimensional image is unnecessary when only a narrow line image is required.

In addition, the SLA permits a reduction in size of the digitizer 100 because the object to image distance may be as short as approximately 15 mm. Alternatively, such distance may be as long as is economically feasible. Usually these lenses have a maximum conjugate in the range of 50 mm. The short object to image distance achievable with the SLA also enables the digitizer 100 to avoid the use of mirrors. Such mirrors are otherwise typically utilized to fold the image path to an acceptable volume. Accordingly, the elimination of such mirrors lowers cost and increases both image quality and throughput by avoiding the radiometric losses associated with each mirror surface.

In yet another embodiment consistent with the present invention, the electronic processing circuitry 114 may be modified to eliminate the need for a log amplifier. Such log amplifiers have been utilized in order to amplify the incoming analog signal, and thereby maintain quality of the imaging by maintaining the photometric resolution over a large density range.

The electronic processing circuitry 114 may contain a suitably high resolution A/D converter that advantageously enables elimination of the log amplifier without sacrificing adequate photometric resolution. For instance, in one exemplary embodiment, the A/D converter 108 may be a 16 bit A/D converter to digitize the input analog signals and still provide adequate photometric resolution down to approximately 3.6 density. Elimination of the log amplifier reduces costs and improves digitizing speed because log amplifiers tend not to have adequate amplifying bandwidth without incurring some associated disruptions. One such disruption is in a reduction in apparent optical modulation when a log amplifier is utilized. Another disruption is the addition of noise. Elimination of the amplifier eliminates the noise associated with the amplifier. In addition, another benefit of eliminating the amplifier is in reduced calibration time since calibration time for log calibration is not necessary.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A digitizer for digitizing an image on a data medium comprising:
   an illuminator configured to generate light directed towards said data medium to be digitized; and
   a mask configured to rotate about a central axis, wherein a portion of said mask affects a portion of said light from an associated portion of said illuminator depending on an amount of rotation of said mask from a base rotation position.

2. The digitizer of claim 1, wherein said mask is affixed to said illuminator and said illuminator is configured to rotate.

3. The digitizer of claim 1, wherein said mask defines an inner cavity, and wherein said illuminator is positioned within said inner cavity.

4. The digitizer of claim 1, wherein said amount said mask is rotated from said base rotation position is based on a width of said data medium to be digitized.

5. The digitizer of claim 4, further comprising a page width guide mechanically coupled to said mask, and wherein movement of said page width guide causes said mask to rotate to an associated rotation position.

6. The digitizer of claim 5, where wherein said page width guide has a first guide position associated with a first width of said data medium and a second guide position associated with a second width of said data medium, wherein said second width is less than said first width, and wherein said mask rotates from a first position associated with said first guide position to a second position associated with said second guide position upon associated movement of said page width guide such that a first effective portion of said light is substantially equal to said first width of said data medium when said mask is in said first position, and wherein a second effective portion of said light is substantially equal to said second width of said data medium when said mask is in said second position.

7. The digitizer of claim 1, wherein a remainder of said light from said illuminator not affected by said mask is an effective portion of said light, wherein said effective portion is substantially equal to a width of said data medium to be digitized.

8. The digitizer of claim 1, wherein said portion of said mask substantially blocks said portion of said light from said associated portion of said illuminator.

9. The digitizer of claim 1, further comprising a page width guide mechanically coupled to said mask, and wherein movement of said page width guide causes said mask to rotate to an associated rotation position.

10. The digitizer of claim 1, wherein said illuminator comprises a rare gas, external electrode, cold cathode fluorescent lamp.

11. The digitizer of claim 10, wherein said data medium is a transparent data medium and said illuminator is a transparency illuminator configured to illuminate said transparent data medium.

12. The digitizer of claim 10, wherein said rare gas, external electrode, cold cathode fluorescent lamp has a warm up time of less than about 0.2 seconds.

13. A method of reducing flare from an illuminator during digitizing of a data medium, said method comprising the step of:

generating light directed towards said data medium; and rotating a mask about a central axis a predetermined amount from a base rotation position, wherein a portion of said mask affects a portion of said light from an associated portion of said illuminator depending on said predetermined amount of rotation from said base rotation position.

14. The method of claim 13, wherein said mask portion of said mask substantially blocks said portion of said light from said associated portion of said illuminator.

15. The method of claim 14, wherein a remainder of said light from said illuminator not blocked by said mask is an effective portion of said light, wherein said effective portion is substantially equal to said width of said data medium to be digitized.

16. The method of claim 13, further comprising the step of:

positioning a page width guide to a position associated with a width of said data medium, wherein said position of said page width guide determines said predetermined amount of rotation from said base rotation position.

17. A digitizer for digitizing a transparent data medium in a medical application, said digitizer comprising:

an illuminator configured to generate light directed towards said transparent data medium to be digitized;

a mask configured to rotate about a central axis, wherein a portion of said mask affects a portion of said light from an associated portion of said illuminator depending on an amount of rotation of said mask from a base rotation position;

a lens configured to direct said light;

a light sensitive element configured to convert said light directed from said lens into an analog signal representative of data recorded on said data medium, wherein said light sensitive element has a width substantially equal to a maximum width of said data medium; and electronic processing circuitry coupled to said light sensitive element, said circuitry configured to convert said analog signal into a digital signal representative of data recorded on said data medium.

18. The digitizer of claim 17, wherein said light sensitive element comprises a charge coupled device array.

19. The digitizer of claim 17, wherein said lens comprises a self-focusing lens array.

20. The digitizer of claim 18, wherein said self-focusing lens array has a width substantially equal to said width of said light sensitive element.

21. The digitizer of claim 17, wherein said illuminator is a rare gas, external electrode, cold cathode fluorescent lamp.

22. The digitizer of claim 17, wherein said transparent data medium comprises an X-ray film.

23. A digitizer for digitizing a transparent data medium in a medical application, said digitizer comprising:

an illuminator configured to generate light directed towards said transparent data medium to be digitized;

a mask configured to rotate about a central axis, wherein a portion of said mask affects a portion of said light from an associated portion of said illuminator depending on an amount of rotation of said mask from a base rotation position;

a light sensitive element configured to convert said light beam directed from said lens into an analog signal representative of data recorded on said data medium; and electronic processing circuitry coupled to said light sensitive element, said circuitry comprising an analog to digital converter configured to convert said analog signal to a digital signal, said digital signal having at least 16 bits of significant digits.

24. A digitizer for digitizing an image on a data medium comprising:

an illuminator configured to generate light directed towards said data medium to be digitized;

a mask; and a page width guide mechanically coupled to said mask, wherein movement of said page width guide causes an associated movement of said mask.

* * * * *